United States Patent [19]

Lederman

[11] Patent Number: 4,828,085
[45] Date of Patent: May 9, 1989

[54] ROLLER CLUTCH WITH SELF ALIGNING ENERGIZING SPRINGS

[75] Inventor: Frederick E. Lederman, Sandusky, Ohio

[73] Assignee: General Motors Corporation, Detroit, Mich.

[21] Appl. No.: 123,815

[22] Filed: Nov. 23, 1987

[51] Int. Cl.⁴ .................. F16D 41/06; F16D 15/00
[52] U.S. Cl. ................................................ 192/45
[58] Field of Search ...................... 192/45; 188/82.84

[56] References Cited

U.S. PATENT DOCUMENTS

| | | | |
|---|---|---|---|
| 2,699,239 | 1/1955 | Klonoski | 192/45 |
| 3,087,590 | 4/1963 | Gorsky | 192/45 |
| 3,732,956 | 5/1973 | Johnson et al. | 192/45 |
| 3,760,914 | 9/1973 | Gelbrich | 192/45 |
| 3,863,742 | 2/1975 | Elmore et al. | 192/45 |
| 4,415,072 | 11/1983 | Shoji et al. | 192/45 |
| 4,723,645 | 2/1988 | Rabe | 192/45 |

*Primary Examiner*—Rodney H. Bonck
*Attorney, Agent, or Firm*—Patrick M. Griffin

[57] ABSTRACT

A roller clutch has springs which, rather than being fixed to the cage, are pivotally attached to the cage so that they can pivot and change the angle of the spring active portion in response to roller travel, thereby self aligning along an optimal line of force.

3 Claims, 2 Drawing Sheets

ROLLER CLUTCH WITH SELF ALIGNING ENERGIZING SPRINGS

This invention relates to roller clutches in general, and specifically to a roller clutch in which the energizing spring can self align to maintain itself on an optimal line of force as it energizes the rollers.

BACKGROUND OF THE INVENTION

The two most common types of one way clutches found in automatic transmission applications are roller clutches and sprag clutches. Roller clutches have a plurality of caged rollers, each of which is located in a wedging pocket formed between a cylindrical pathway on one race and a sloped cam ramp on another race. Sprag clutches have a plurality of generally dumbbell shaped sprags located between two cylindrical pathways. Roller clutches are preferred to sprag clutches in many applications, both because of the lower cost of the clutch itself, and also because a roller clutch can tolerate a much greater degree of eccentricity between the clutch races, which allows for an easier clutch installation. This greater tolerance for race eccentricity results from the fact that the rollers are each individually spring energized, and can move independently up or down the cam ramps as the clutch overruns. Each roller, assisted by the continual bias by its respective energizing spring, automatically self seeks its own optimal position during clutch overrun. This optimal roller position can be termed the ready position, that is, the position where it is lightly engaged between the pathway and cam ramp, ready to quickly jam between the races. However, the ability of the roller to move up and down the cam ramp also creates some potential problems, especially in hign speed environments and environments where the rollers will be subjected to a high degree of external roller disturbing forces. These potential problems may be best illustrated by referring to FIGS. 1 through 3, which illustrate the structure and operation of a typical conventional roller clutch.

A conventional roller clutch, indicated generally at 10, includes a complement of cylindrical rollers 12, each of which is located in a wedging pocket formed between the cylindrical pathway 14 of an outer race 16 and a confronting cam ramp 18 formed on a substantially coaxial inner cam race 20. Clutch 10 has a cage 22 that forms its basic structural framework, and which is sized so as to be easily installed between the races 16 and 20, and tied to the cam race 20. Cage 22 is a fairly typical construction, and consists of a circumferentially spaced plurality of molded plastic journal blocks, one of which is indicated generally at 24, which are attached to a metal end ring 26. End ring 26 is partially broken away to show the roller 12 and journal block 24. Each journal block 24 is molded with a flat cross bar 28, which generally lies on a plane that is parallel with the axis of cage 22. A conventional energizing spring, designated generally at 30, has a generally square base mounting fold 32 clipped over cross bar 28, a roller conforming front contact loop 34 pressed against the side of a respective roller 12, and a serpentine central active portion 36 which consists of a series of V shaped folds. Cage 22 is the concentricity control type, meaning that the journal blocks 24 act as plain bearing members, and are sized so as to fit between the races 16 and 20 closely enough to keep the races substantially coaxial during overrun, but with enough clearance to allow for an easy installation of cage 22. This clearance, which is exaggerated for purposes of illustration in FIG. 1, also creates a running eccentricity between the races 16 and 20. During overrun, when the outer race 16 turns counter clockwise relative to inner race 20, the wedging pockets on one side of clutch 10 will widen, while those on the other side will narrow. The wedging pockets will not be of the same width at any instant of time, and over any time period, may each widen and narrow many times, especially at high speed. The race eccentricity is compensated for by the ability of each roller 12 to move rapidly up and down cam ramp 18 as its wedging pocket narrows and expands, generally referred to as roller travel. The energizing spring continually expands and contracts following the roller 12 as it so moves, and keeping it at ready position. A comparison of FIGS. 1 and 2 illustrates roller travel.

The forces that act on roller 12 during overrun, other than external roller disturbing forces, are those induced by the spring 30 and the manner in which it forces its roller 12 into the pathway 14 and the cam ramp 18. So long as roller 12 is kept in contact with with the pathway 14 and its respective cam ramp 18 by its spring 30, it will be maintained generally parallel to the race axis, its ideal orientation, regardless of its position on the cam ramp. The orientation of spring 30, however, will not be as ideally determined. The orientation of spring 30 is best considered in terms of its line of force, shown by dotted lines drawn between and perpendicular to both the center axis of roller 12 and the surface from which spring 30 pushes, that is, the surface of cross bar 28 that faces roller 12. The ideal or optimal line of force of spring 30 would be one which was directed more toward the cam ramp 18, rather than toward the pathway 14. This is because of the dynamic effects on the roller 12 at high speed overrun. The traction of the rapidly relatively rotating pathway 14 on roller 12, even if small in terms of percentage, can still result in a rapid spinning of roller 12, and consequent wear against cam ramp 18. Orienting the spring 30 so as to force the roller 12 more strongly toward cam ramp 18 than pathway 14 can help minimize roller spin. Furthermore, an optimal orientation for spring 30 would also be one in which all the pleats of the spring active portion 36 opened and closed equally and symmetrically about the spring center line, that is, the spring center line and spring line of force would be coincident, or at least close to it. This would minimize spring stress concentrations and oscillations and resist any tendency of the spring 30 to warp out of a straight line, maximizing spring life and stability.

With the conventional spring 30, however, that ideal spring orientation cannot be realized. The line of force of spring 30 will be determined by the position of roller 12 on the cam ramp 18, which changes dynamically, and by the location and orientation of cross bar 28 relative to roller 12. Cross bar 28, and thus the spring mounting fold 32. are fixed relative to cam ramp 18. As seen in FIG. 1, the orientation of cross bar 28 is such that, when roller 12 is located far up cam ramp 18, the spring line of force is directed toward pathway 14, and is offset a good deal from the spring center line, neither of which are optimal spring parameters. While the orientation of cross bar 28 could be initially tilted to direct spring 30 more toward the cam ramp 18 when the roller 12 was in the FIG. 1 position, to do so would threaten the spring operation when the journal block 24 was tight between the races 16 and 20, and the roller 12 was consequently located farther down cam ramp 18. Then, the roller 12 would have a tendency to move under the spring front loop, which could cause the entire spring 30 to pop up into the pathway 14 and lose contact with roller 12. This tendency of roller 12 to dive under spring 30 is worsened by the fact that external roller disturbing forces can actually cause roller 12 to move even farther down cam ramp 18, even out of contact with pathway 14, which is generally referred to as roller pop out, and shown in FIG. 3. It is not feasible to make spring 30 strong enough to resist roller pop out, as that would only worsen pathway traction. So, at no point is the line of force of conventional spring 30 optimal, either in terms of its direction or in terms of being close to the center line of the spring 30. While clutches like clutch 10 certainly work, their operation is not optimized.

SUMMARY OF THE INVENTION

The invention provides a roller clutch which is similar to the conventional one described above in terms of size, cage construction, and rollers, and which is installed between identical races. However, the energizing springs are able to self align, and thus operate on, and maintain themselves on, an optimal line of force.

The energizing spring of the invention, just as with conventional springs, has a roller engaging front contact portion and a substantially straight line active portion. The base of the spring is not fixed, however, but is allowed to pivot relative to the cage as the roller moves up and down the cam ramp and the spring follows the roller. Consequently, the angle of the active spring portion can change in response to roller travel, allowing the spring to self align. Specifically, in the preferred embodiment disclosed, the energizing spring is the serpentine compression type, and is also symmetrical about its center line, with identical end loops, each of which is sized so as to conform to a roller. Each cage journal block includes a spring mount which, rather than being flat, is partially cylindrical and parallel to a respective roller, with a radius equal to the roller. Each spring may therefore be compressed between a roller and respective spring mount in either direction when the clutch is assembled. The line of force of each spring is optimized as to direction, meaning that it faces more toward the cam ramp than the pathway, to minimize pathway traction on the roller. That general spring orientation can maintain itself as the roller travels, unlike a spring with a fixed base. The spring loop that is pressed against the cylindrical spring mount can slide over it, pivoting, in effect, to allow the spring to rock between the spring mount and the roller. The roller will not dive under the spring as in the conventional case, even in the event of roller pop out. Furthermore, the lne of force of the self aligning spring is optimized as to its location relative to the spring center line, being maintained essentially coincident with the spring center line, so that compression and expansion occurs most efficiently.

It is, therefore, an object of the invention to improve the operation of a roller clutch energizing spring by allowing it to self align along an optimal line of force as the roller travels.

It is another object of the invention to optimize the line of force of the spring by allowing the base of the spring to pivot relative to the cage so that the angle of the active portion of the spring can change in response to roller travel.

It is yet another object of the invention to provide cylindrical spring mounts parallel to the rollers and of similar radius, and to provide symmetrical springs with roller conforming end loops, so that the springs can be compressed in either direction between the rollers and respective spring mounts, and will self align so as to maintain a line of force with optimal direction and optimal location relative to the spring center line.

DESCRIPTION OF THE PREFERRED EMBODIMENT

These and other objects and features of the invention will appear from the following written description, and from the drawings, in which:

FIG. 5 shows the roller farther down the cam ramp;

FIG. 6 shows a potential roller pop out position.

Figure 1:
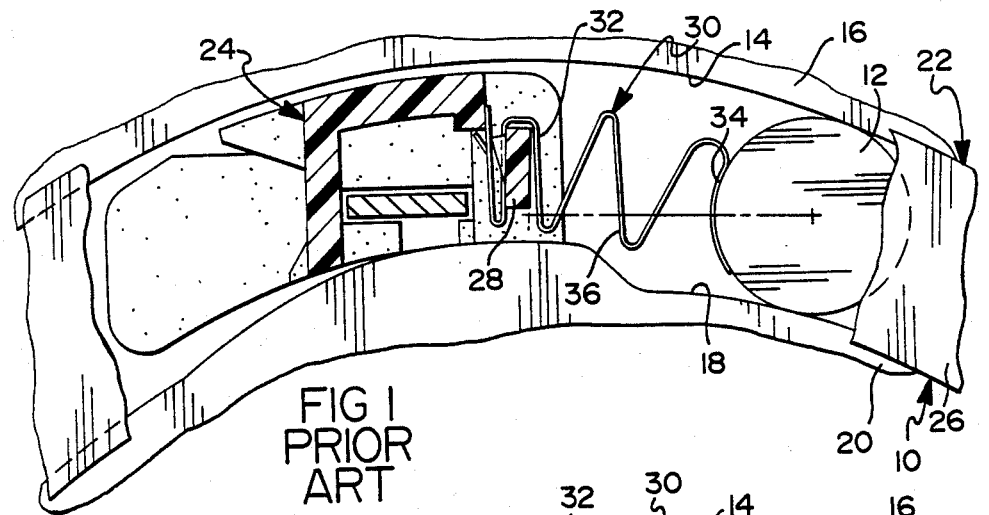
FIGS. 1 through 3 show the prior art roller clutch already described above.
Figure 2:
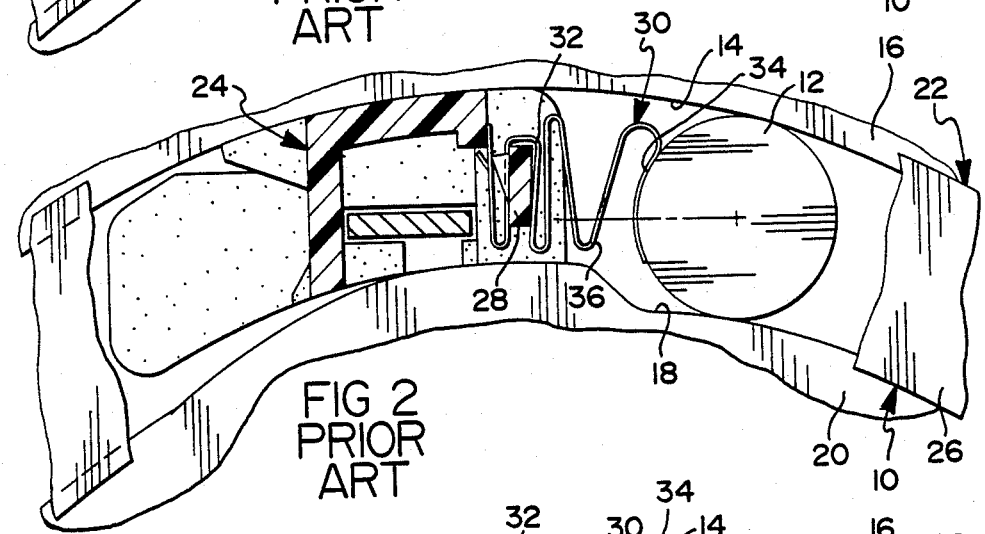
Figure 3:
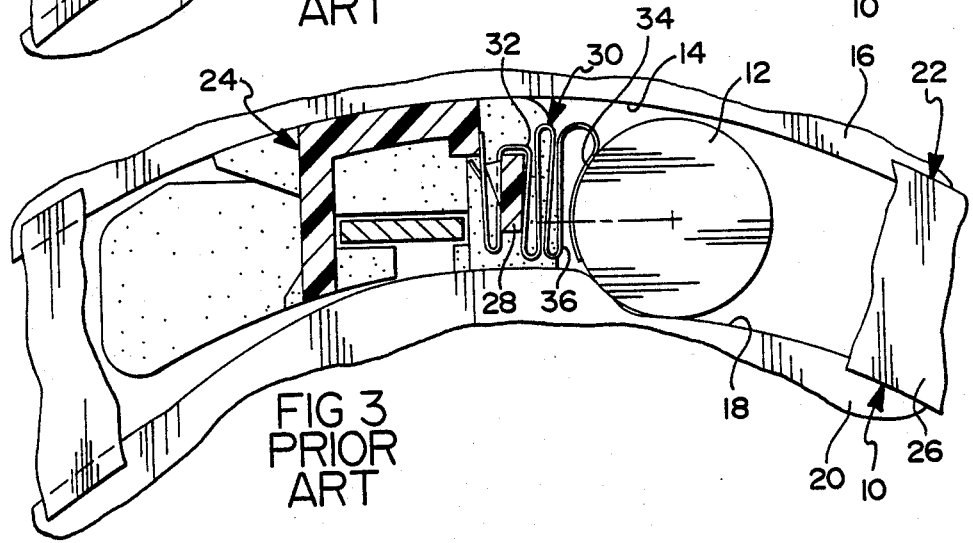
Figure 4:
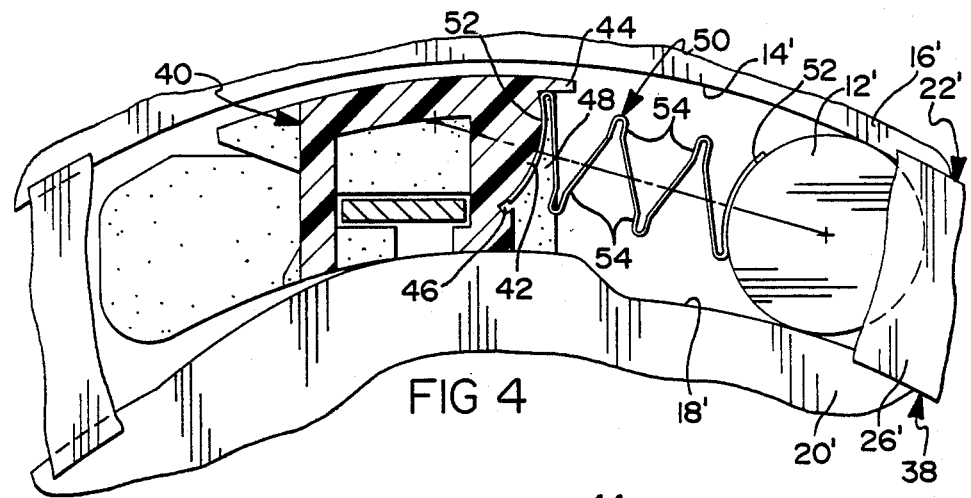
FIGS. 4 through 6 show a preferred embodiment of the invention, with FIG. 4 showing a roller positioned at a far point up its respective cam ramp.

Referring first to FIG. 4, the preferred embodiment of the invention, indicated generally at 38, has several identical components, and is used between identical clutch races, as the conventional clutch 10 described above. These components are given the same number with a prime, and are not described again. The journal blocks and energizing springs are different, however. Journal block 40 is molded on one side with an inset spring mount 42 that is cylindrical and has a radius equal to roller 12', with an axis that is parallel to the axis of both roller 12' and cage 38. Spring mount 42 is bounded above by an overhang 44, below by a thin slot 46, and on one side by a wall 48.

Still referring to FIG. 4, energizing spring 50 is the serpentine compression type, and has identical end loops 52, each of which has a radius equal to that of roller 12' and a width slightly less than spring mount 42. The central active portion of spring 50 consists of a series of identical V folds 54. Spring 50 is thus symmetrical about its center line. Spring 50 fits between spring mount 42 and roller 12', with its front end loop 52 pressed against roller 12' and the back end loop 52 pressed against spring mount 42. The length of spring 50 is chosen such that it will fit always be under some compression, at least enough to provide the necessary energizing force, and also enough to hold roller 12' against the opposite side of the adjacent journal block 40 during shipping, if desired. Since spring 50 does not sit against a flat surface, its line of force is determined between, and perpendicular to both, the center axis of roller 12', and the center axis of the cylindrical spring mount 42. The axis of spring mount 42 is positioned above the axis of roller 12' so that the direction of the spring line of force is optimal in terms of direction. That is, the line of force is directed toward the cam ramp 18', so as to minimize roller traction. Furthermore, the spring line of force is optimal in that the spring 50 is seated between roller 12' and spring mount 42 with its center line and the spring line of force essentially coincident. If this orientation could be maintained with roller travel, then spring 50 would expand and contract symmetrically about its center line, which would minimize stress concentrations and warping. The invention does allow that optimal spring orientation to be substantially maintained, as will be described next.

Figure 5:
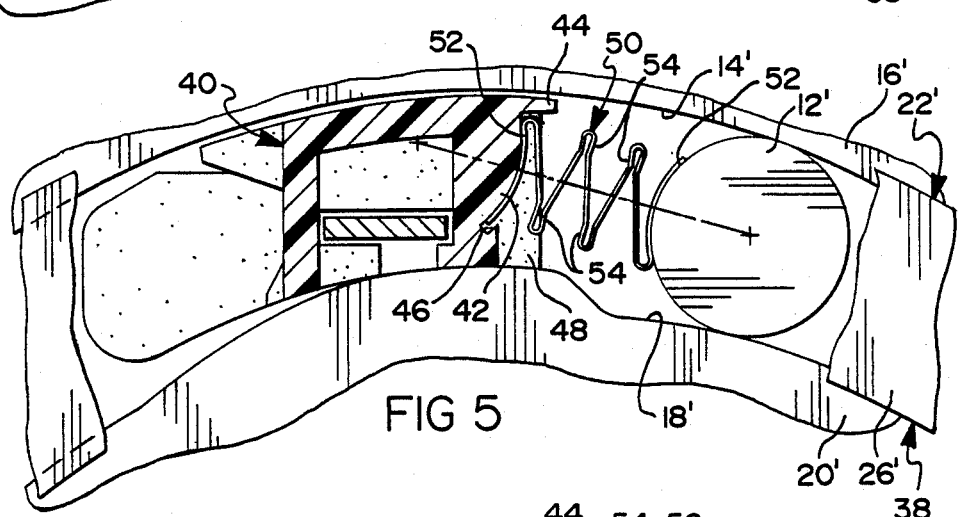
Figure 6:
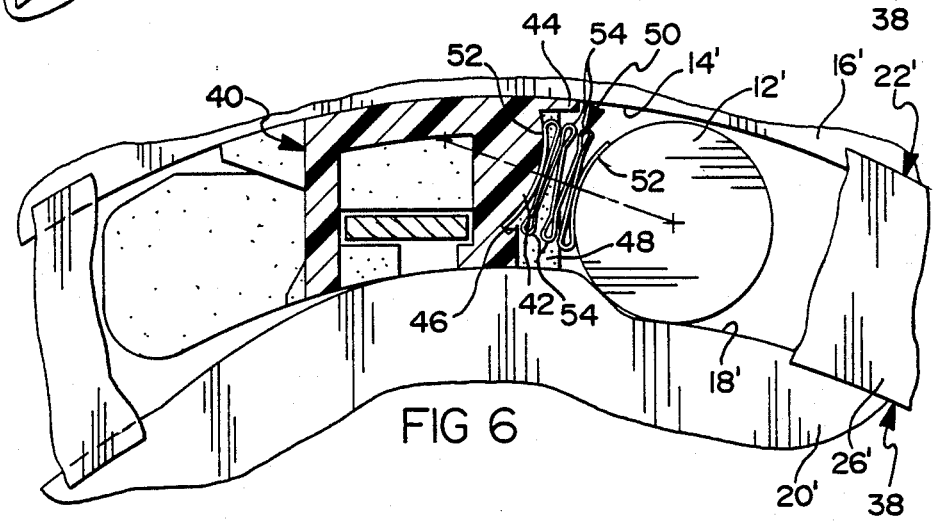

Comparing FIGS. 4 to 5 and 6, it will be seen that as roller 12' moves down cam ramp 18', spring 50 rocks downwardly with it, as front spring loop 52 slides over the surface of roller 12' and back spring loop 52 slides down over the surface of spring mount 42. The back end loop 52 can slide up and down freely on the outer surface of spring mount 42, given their matching curvatures, but will be limited and confined between overhang 44 and slot 46. In effect, the back spring loop 52 pivots about the center axis of spring mount 42, which allows the angle of the active portion of the spring to change in response to the travel of roller 12'. The center axis of spring mount 42 is always above the center axis of roller 12' at all roller positions, so the general direction of the line of force of spring 50 remains toward camp ramp 18'. Furthermore, because of the symmetrical configuration of spring 50 and the conformation of its identical end loops 52 to the spring mount 42 and the roller 12', the spring 50 can shift between the roller 12' and spring mount 42 as they move relative to one another, rocking and sliding to maintain its center line and its line of force essentially coincident. This continual self alignment of spring 50 allows for the most efficient and stress free expansion and contraction of the active V folds 54, and assures that the roller 12' will compress the spring 50 straight back into the spring mount 42, even at roller pop out. This avoids the potential for squeezing spring 50 up and out of contact with roller 12', as with a conventional spring. Journal block 40 is no more expensive to mold than conventional journal block 24. Spring 50 is, if anything, easier to manufacture than conventional spring 30, and is easier to install, given its total symmetry.

Variations of the preferred embodiment may be made within the spirit of the invention. The energizing spring need not be confined to a compression spring. A tension spring that pulled the roller up the cam ramp, rather than pushed the roller up the cam ramp, could also be joined to the clutch cage with a pivotal connection, giving a similar self alignment. Other types of pivotal spring base to cage connections could be used that would allow the angle of the active portion of the spring to change in response to roller movement so as to maintain a desired orientation of the spring line of force. The cylindrical spring mount 42 is a very advantageous way of providing an effective pivot, however. The advantage of the cylindrical spring mount becomes even greater when its radius is made the same as the roller 12', since it allows for the identical spring loops 52. However, the spring mount 42 need not absolutely be of a radius equal to roller 12' just to obtain the pivoting action. The spring need not be made symmetrical just to pivot, but making it so also achieves the efficient and stress free spring operation that results from having the spring center line and spring line of force coincident. Therefore, it will be understood that the invention is not intended to be limited to just the preferred embodiment disclosed.

The embodiment of the invention in which an exclusive property or privilege is claimed are defined as follows:

1. A one way roller clutch of the type having a complement of rollers, each of which is located between a cylindrical pathway on one clutch race and a cam ramp on another, substantially coaxial clutch race, with each roller moving up and down its respective cam ramp as said clutch operates but being continually urged up said cam ramp, said roller clutch comprising, a cage adapted to be installed between said races so as to locate said rollers between said pathway and their respective cam ramps, and,
a plurality of roller energizing springs, one respective to each of said rollers, each of said springs further comprising,
a base portion rockably and slidably mounted to said cage,
a contact portion engaging said roller, and,
an active portion extending along a substantially straight line between said pivoting base portion and contact portion,
whereby, as said roller moves up and down said cam ramp, said base portion may rock and slide on said cage, thereby effectively pivoting relative to said cage so as to allow the angle of said spring active portion to change, said spring thereby self aligning along an optimal line of force.

2. A one way roller clutch of the type having a caged complement of rollers, each of which is located between a cylindrical pathway on one clutch race and a cam ramp on another, substantially coaxial clutch race, with each roller moving up and down its respective cam ramp as said clutch operates but being continually urged up said cam ramp, said roller clutch comprising, a plurality of spring mounts on said cage, each having a partially cylindrical surface that is spaced from and substantially parallel to a respective roller,
a plurality of energizing springs, each of which is compressed between a respective roller and spring mount and each of which has a base portion sized so as to fit slidably against said respective cage spring mount,
whereby, as said roller moves up and down its respective cam ramp, said spring base may slide along said spring mount to allow the angle of said spring active portion to change, said spring thereby self aligning along an optimal line of force.

3. A one way roller clutch of the type having a caged complement of rollers, each of which is located between a cylindrical pathway on one clutch race and a cam ramp on another, substantially coaxial clutch race, with each roller moving up and down its respective cam ramp as said clutch operates but being continually urged up said cam ramp, said roller clutch comprising, a plurality of spring mounts on said cage, each having a partially cylindrical surface with a radius similar to said rollers and spaced from and substantially parallel to a respective roller,
a plurality of energizing springs, each of which is substantially symmetrical along its center line with similarly sized end leaves that each have a radius substantially identical to said rollers, so that said springs may each be compressed between a respective roller and spring mount with one end leaf slidably engaged with a roller and the other end leaf slidably engaged with its respective spring mount,
whereby, as said roller moves up and down its respective cam ramp, one of said spring end leaves slides along said spring mount and the other slides along said respective roller so that said spring may self align between said spring mount and respective roller, said spring thereby compressing and expanding substantially symmetrically along a line of force substantially coincident with its center line.

* * * * *